United States Patent Office 3,069,450
Patented Dec. 18, 1962

3,069,450
PREPARATION OF ALUMINUM TRIALKYL
COMPOUNDS
Mark T. Atwood and Gifford G. McClaflin, Ponca City,
Okla., assignors to Continental Oil Company, Ponca
City, Okla., a corporation of Delaware
No Drawing. Filed Dec. 11, 1958, Ser. No. 779,526
8 Claims. (Cl. 260—448)

The present invention relates to the preparation of aluminum trialkyl compounds. More particularly, the present invention relates to the reaction of an aluminum organic compound and ethylene to give a mixture of straight-chain and branched-chain, high-molecular weight aluminum trialkyl compounds.

A preferred method, as taught by the prior art, for the preparation of straight-chain, high-molecular weight aluminum trialkyl compounds has been the reaction between triethylaluminum and ethylene. German Patent No. 917,006, issued July 15, 1954, to Karl Ziegler, teaches the aforementioned method.

The use of triisobutylaluminum, however, offers many advantages not possessed by triethylaluminum. A first advantage is that triisobutylaluminum is more easily prepared than triethylaluminum. For example, a preferred commercially feasible method of preparing triethylaluminum involves a two-step process in which a substantial proportion of the product of the second step, triethylaluminum, is recycled to the first step. A more complete description of this process may be found in Belgian Patent No. 546,432, issued March 24, 1956, to Karl Ziegler. In addition, Horace E. Redman in U.S. Patent No. 2,787,626 describes another embodiment of this process. Triisobutylaluminum, however, may be prepared by a relatively convenient one-step process. Briefly, this process consists of reacting finely-divided aluminum, having a clean surface, with isobutene and hydrogen in the presence of a minor amount of a catalyst, using controlled pressure and temperature. An example of a suitable catalyst is diisobutyl-aluminum bromide. A more complete description of this process may be found in British Patent No. 770,707, issued March 20, 1957, to Karl Ziegler.

A second advantage is that triisobutylaluminum is easier to handle commercially than triethylaluminum. For example, triethylaluminum is spontaneously inflammable in air, while triisobutylaluminum merely fumes in air and does not burn.

Previously, workers in the field of aluminum trialkyls have been of the belief that triisobutylaluminum would not enter into a growth reaction with ethylene. The findings of our invention, therefore, are contrary to the teachings of the prior art.

It is an object of the present invention to prepare high-molecular weight aluminum trialkyl compounds. It is another object of the present invention to prepare a mixture of straight-chain and branched chain, high-molecular weight aluminum trialkyl compounds by the reaction of ethylene and an aluminum organic compound. Other objects will be apparent to those skilled in the art as the description proceeds.

The aluminum organic compounds used as starting materials in the reaction of the present invention are of the type

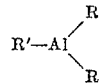

where R is a hydrocarbon group having the formula

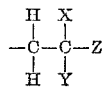

where X is a saturated alkyl group containing from 1 to 10 carbon atoms, Y is either a saturated alkyl group containing from 1 to 10 carbon atoms or hydrogen, and Z is a saturated alkyl group containing from 1 to 100 carbon atoms, and where R' is either R or hydrogen. For practical purposes, we prefer to use aluminum organic compounds in which Z contains from 1 to 40 carbon atoms.

Using triisobutylaluminum as a typical example, the reactions which occur in the process of our invention are believed to be as follows:

(1) $Al[CH_2CH(CH_3)_2]_3 + 3C_2H_4$
$\rightarrow Al(C_2H_5)_3 + CH_2=C(CH_3)_2$
(2) $Al(C_2H_5)_3 + 3nC_2H_4 \rightarrow Al[(C_2H_4)_nC_2H_5]_3$
(3) $Al[CH_2CH(CH_3)_2]_3 + 3nC_2H_4$
$\rightarrow Al[(C_2H_4)_nCH_2CH(CH_3)_2]_3$ From these reactions it is apparent that a low-molecular weight olefin is formed as a by-product.

The high-molecular weight aluminum trialkyl compounds may be converted alcohols and α-olefins by processes known in the art. As is apparent from Equation 3 of the preceding paragraph, the branched-chain aluminum trialkyl compound contains a tertiary hydrogen. (The term "tertiary hydrogen" refers to a hydrogen atom which is bonded to a tertiary carbon atom.) By replacing this hydrogen, a bifunctional compound may be prepared. As is well known, bifunctional compounds are highly desirable, due to their utility. For example, the tertiary hydrogen may be replaced by a halogen, nitro groups, sulfonate groups, et cetera. Many possible reactions for this tertiary hydrogen will be readily apparent to those skilled in the art.

From the preceding discussion, it is evident that the formation of this branched-chain aluminum trialkyl compound, possessing a tertiary hydrogen, forms a salient feature of our invention. In general, the process yields about one mole of branched-chain compound for every two moles of straight-chain compound.

The reaction conditions for our process may be summarized as follows:

| Reaction Variable | Suitable range | Preferred range |
|---|---|---|
| Ethylene/aluminum organic compound, mole ratio | 1/1–1,000/1 | 24/1–120/1 |
| Pressure, p.s.i.g. | 250–10,000 | 1,400–5,000 |
| Temperature, °C | 70–160 | 100–120 |
| Time, hours | 1–100 | 2–10 |

In order to disclose more clearly the nature of the present invention and the advantages thereof, reference will hereinafter be made to certain specific embodiments which illustrate the flexibility of the herein-described process. It should be clearly understood, however, that this is done solely by way of example and is not to be construed as a limitation upon the spirit and scope of the appended claims.

The analytical data in the examples were obtained by GLPC analyses. The expression, "GLPC," refers to gas liquid partition chromatography. This analytical technique is adequately described in either of the following publications: Analyst, 77, 1952, pages 915–932, or Petroleum Refiner 1955, pages 165–169.

EXAMPLE I

In a one-liter stirring autoclave was placed 163 grams (0.823 mole) of triisobutylaluminum, contained in 400 milliliters of mixed xylene as a solvent. Ethylene was added to the autoclave, with the pressure being increased gradually to about 4000 p.s.i.g. The temperature was now about 100° C. While still maintaining an ethylene atmosphere, the autoclave was kept at a temperature of 100–120° C. and a pressure of 4000 to 4200 p.s.i.g. for two additional hours. After cooling, the autoclave was vented to atmospheric pressure. The contents of the autoclave were removed and hydrolyzed to give a series of saturated hydrocarbons and aluminum hydroxide.

Based on the triisobutylaluminum charged, a conversion of 93.9 percent was obtained, with 96.1 percent of the material converted being recovered. On an overall basis, the ratio of branched-chain material to straight-chain material was 0.41 to 1.0. Excluding $C_2$ and $C_4$ material, the ratio of branched-chain material to straight-chain material was 1.32 to 1.0. The data for this are shown in the table.

In this example an excess of ethylene was used. The amount of ethylene required is dependent on the product desired. In the table which follows, the amount of ethylene reacted can be calculated if desired.

*Table*

ANALYTICAL DATA—REACTION PRODUCTS—
EXAMPLE I [1]

| Hydrocarbon | Moles | Percent yield [2] |
|---|---|---|
| $C_2$ | 0.634 | 25.60 |
| $C_4$ | 0.447 | 18.10 |
| $nC_6$ | 0.226 | 9.15 |
| $isoC_6$ | 0.166 | 6.72 |
| $nC_8$ | 0.150 | 6.08 |
| $isoC_8$ | 0.265 | 10.73 |
| $nC_{10}$ | 0.089 | 3.60 |
| $isoC_{10}$ | 0.116 | 4.70 |
| $nC_{12}$ | 0.023 | 0.93 |
| $isoC_{12}$ | 0.068 | 2.75 |
| $nC_{14}$ | 0.006 | 0.24 |
| $isoC_{14}$ | 0.030 | 1.22 |
| $nC_{16}$ | | |
| $isoC_{16}$ | 0.007 | 0.28 |

[1] GLPC analyses: Based on the assumption that volume percent and weight percent are equivalent. This is approximately true.
[2] Based on 2.469 moles isobutyl groups charged.

EXAMPLE II

In this example, a continuous process was used. The equipment consisted of a one-inch O.D. continuously operating tower packed with ¼-inch glass helices. A 25 percent by volume solution of triisobutylaluminum in xylene was charged to the tower. This material was reacted with ethylene (concurrent flow) at 117° C. and 1490 p.s.i.g. for 2.9 hours. The product was withdrawn in continuous manner from the top of the reactor. When all of the product had been collected, it was hydrolyzed by dropping it slowly into a 25 percent solution of hydrochloric acid. The organic hydrolysis layer was fractionally distilled to give, besides xylene, a series of hydrocarbons, which correspond to those of Example I. On an overall basis, the ratio of branched-chain hydrocarbons to straight-chain hydrocarbons was approximately 1 to 2.

EXAMPLE III

Example I was repeated with the exception that tri-2-methylpentylaluminum was substituted for triisobutylaluminum. The product was obtained after hydrolysis contained a mixture of straight-chain and branched-chain hydrocarbons.

In summary, Example I has shown that, contrary to previous belief, triisobutylaluminum does enter into a growth reaction with ethylene. High-molecular weight materials are obtained which may be converted into useful products. Example II has shown that this reaction may be conducted in a continuous manner. Example III has shown that the reaction is applicable to other aluminum organic compounds as hereinbefore defined.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. A process for preparing a mixture of straight-chain and branched-chain, high molecular weight aluminum trialkyl compounds wherein said branched-chain, high molecular weight aluminum trialkyl compounds possess a tertiary hydrogen atom, said process consisting essentially of reacting ethylene with an aluminum organic compound having the formula

wherein R is a hydrocarbon group having the formula $$-\underset{\underset{H}{|}}{\overset{\overset{H}{|}}{C}}-\underset{\underset{Y}{|}}{\overset{\overset{X}{|}}{C}}-Z$$

where X is a saturated alkyl group containing from 1 to 10 carbon atoms, Y is selected from the group consisting of hydrogen and a saturated alkyl group containing from 1 to 10 carbon atoms, and Z is a saturated alkyl group containing from 1 to 100 carbon atoms, and wherein R′ is selected from the group consisting of R and hydrogen, said process being characterized further in that (1) the mole ratio of ethylene to aluminum organic compound is from 1:1 to 1000:1, (2) the pressure is from 4,000 to 10,000 p.s.i.g., (3) the temperature is from 70 to 160° C., and (4) the reaction time is from 1 to 100 hours.

2. The process of claim 1 wherein the aluminum organic compound is triisobutyl aluminum.

3. A process for preparing a mixture of straight-chain and branched-chain, high molecular weight aluminum trialkyl compounds wherein said branched-chain, high molecular weight aluminum trialkyl compounds possess a tertiary hydrogen atom, said process consisting essentially of reacting ethylene with an aluminum organic compound having the formula

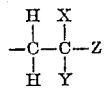

wherein R is a hydrocarbon group having the formula $$-\underset{\underset{H}{|}}{\overset{\overset{H}{|}}{C}}-\underset{\underset{Y}{|}}{\overset{\overset{X}{|}}{C}}-Z$$

where X is a saturated alkyl group containing from 1 to 10 carbon atoms, Y is selected from the group consisting of hydrogen and a saturated alkyl group containing from 1 to 10 carbon atoms, and Z is a saturated alkyl group containing from 1 to 100 carbon atoms, and wherein R′ is selected from the group consisting of R and hydrogen, said process being characterized further in that (1) the mole ratio of ethylene to aluminum organic compound is from 24:1 to 120:1, (2) the pressure is from 4,000 to 5,000 p.s.i.g., (3) the temperature is from 100 to 120° C., and (4) the reaction time is from 2 to 10 hours.

4. The process of claim 3 wherein the aluminum organic compound is triisobutyl aluminum.

5. A process for preparing a mixture of straight-chain and branched-chain, high molecular weight aluminum trialkyl compounds wherein said branched-chain, high molecular weight aluminum trialkyl compounds possess a tertiary hydrogen atom, said process consisting essentially of reacting ethylene with an aluminum organic compound having the formula

wherein R is a hydrocarbon group having the formula

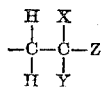

where X is a saturated alkyl group containing from 1 to 10 carbon atoms, Y is selected from the group consisting of hydrogen and a saturated alkyl group containing from 1 to 10 carbon atoms, and Z is a saturated alkyl group containing from 1 to 100 carbon atoms, and wherein R' is selected from the group consisting of R and hydrogen, said process being characterized further in that (1) the mole ratio of ethylene to aluminum organic compound is from 1:1 to 1000:1, (2) the pressure is from about 4,000 to about 4,200 p.s.i.g., (3) the temperature is from 70 to 160° C., and (4) the reaction time is from 1 to 100 hours.

6. The process of claim 5 wherein the aluminum organic compound is triisobutyl aluminum.

7. A process for preparing a mixture of straight-chain and branched-chain, high molecular weight aluminum trialkyl compounds wherein said branched-chain, high molecular weight aluminum trialkyl compounds possess a tertiary hydrogen atom, said process consisting essentially of reacting ethylene with an aluminum organic compound having the formula

wherein R is a hydrocarbon group having the formula

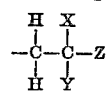

where X is a saturated alkyl group containing from 1 to 10 carbon atoms, Y is selected from the group consisting of hydrogen and a saturated alkyl group containing from 1 to 10 carbon atoms, and Z is a saturated alkyl group containing from 1 to 100 carbon atoms, and wherein R' is selected from the group consisting of R and hydrogen, said process being characterized further in that (1) the mole ratio of ethylene to aluminum organic compound is from 24:1 to 120:1, (2) the pressure is from about 4,000 to about 4,200 p.s.i.g., (3) the temperature is from 100 to 120° C., and (4) the reaction time is from 2 to 10 hours.

8. The process of claim 7 wherein the aluminum organic compound is triisobutyl aluminum.

References Cited in the file of this patent

UNITED STATES PATENTS

| | | |
|---|---|---|
| 2,699,457 | Ziegler et al. | Jan. 11, 1955 |
| 2,835,689 | Ziegler et al. | May 20, 1958 |
| 2,863,896 | Johnson | Dec. 9, 1958 |
| 2,889,385 | Catterall et al. | June 2, 1959 |